United States Patent
Giulietti et al.

(10) Patent No.: US 10,669,071 B2
(45) Date of Patent: Jun. 2, 2020

(54) POWDER CONTAINER SYSTEMS FOR ADDITIVE MANUFACTURING

(71) Applicant: Delavan Inc, West Des Moines, IA (US)

(72) Inventors: Diana Giulietti, Tariffville, CT (US); Matthew Donovan, Ankeny, IA (US); Kiley J. Versluys, Hartford, CT (US); Daniel Brindley, Atlanta, GA (US)

(73) Assignee: DELAVAN INC, West Des Moines, IA (US)

( * ) Notice: Subject to any disclaimer, the term of this patent is extended or adjusted under 35 U.S.C. 154(b) by 653 days.

(21) Appl. No.: 15/195,226

(22) Filed: Jun. 28, 2016

(65) Prior Publication Data

US 2017/0369205 A1  Dec. 28, 2017

(51) Int. Cl.
| | | |
|---|---|---|
| *B29C 64/30* | (2017.01) | |
| *B29C 64/329* | (2017.01) | |
| *B33Y 40/00* | (2020.01) | |
| *B65D 25/42* | (2006.01) | |
| *B33Y 30/00* | (2015.01) | |
| *B65D 43/12* | (2006.01) | |
| *B65D 25/28* | (2006.01) | |

(52) U.S. Cl.
CPC ............. *B65D 25/42* (2013.01); *B33Y 30/00* (2014.12); *B65D 25/2885* (2013.01); *B65D 43/12* (2013.01)

(58) Field of Classification Search
CPC .... B29C 64/255; B29C 64/329; B29C 64/307
See application file for complete search history.

(56) References Cited

U.S. PATENT DOCUMENTS

| | | | |
|---|---|---|---|
| 7,799,253 B2 | 9/2010 | Hochsmann et al. | |
| 7,828,022 B2 | 11/2010 | Davidson et al. | |
| 2002/0090313 A1* | 7/2002 | Wang | B22F 3/004 419/10 |
| 2003/0074096 A1* | 4/2003 | Das | B33Y 30/00 700/119 |
| 2006/0105102 A1* | 5/2006 | Hochsmann | B05D 1/26 427/180 |
| 2008/0006334 A1* | 1/2008 | Davidson | B33Y 30/00 137/571 |
| 2010/0247703 A1* | 9/2010 | Shi | B29C 64/165 425/375 |
| 2010/0247742 A1* | 9/2010 | Shi | C23C 24/04 427/8 |
| 2011/0300248 A1* | 12/2011 | Tung | B33Y 30/00 425/90 |
| 2014/0348969 A1 | 11/2014 | Scott | |
| 2015/0298397 A1 | 10/2015 | Chen et al. | |

(Continued)

FOREIGN PATENT DOCUMENTS

WO    WO-1995034468 A1    12/1995

*Primary Examiner* — Jacob T Minskey
*Assistant Examiner* — Baileigh Kate Darnell
(74) *Attorney, Agent, or Firm* — Locke Lord LLP; Daniel J. Fiorello; Scott D. Wofsy

(57) ABSTRACT

A powder container can include a body defining a chamber having a bulk opening, a moveable cover configured to selectively cover the bulk opening, and a hopper nozzle extending from the body and in fluid communication with the chamber configured to allow powder to exit or enter the chamber, the hopper nozzle being smaller than the bulk opening.

18 Claims, 2 Drawing Sheets

(56) References Cited

U.S. PATENT DOCUMENTS

| | | | |
|---|---|---|---|
| 2015/0308741 A1* | 10/2015 | Chen | F26B 17/16 |
| | | | 34/553 |
| 2016/0271885 A1* | 9/2016 | Shi | B01D 53/0407 |
| 2016/0271886 A1* | 9/2016 | Shi | B29C 64/35 |
| 2017/0036404 A1* | 2/2017 | Rengers | B29C 64/153 |
| 2017/0050270 A1* | 2/2017 | Miyano | B23K 15/02 |
| 2017/0297813 A1* | 10/2017 | Carroll | B65D 90/48 |

* cited by examiner

POWDER CONTAINER SYSTEMS FOR ADDITIVE MANUFACTURING

BACKGROUND

1. Field

The present disclosure relates to additive manufacturing, more specifically to powder container systems for additive manufacturing.

2. Description of Related Art

Current powder bed systems rely on slow and laborious powder loading methods, loading small but heavy containers of metal, one-by-one, into a hopper or feed piston until enough powder is applied. Powder loading, e.g., with a build volume over 4,000 square inches, can take over an hour in some cases. Powder collection can also be a very manual process in powder bed systems, sometimes requiring hand shoveling. There is no process for efficient handling of powder loading, collection, and/or reuse.

Such conventional methods and systems have generally been considered satisfactory for their intended purpose. However, there is still a need in the art for improved powder container systems. The present disclosure provides a solution for this need.

SUMMARY

A powder container can include a body defining a chamber having a bulk opening, a moveable cover configured to selectively cover the bulk opening, and a hopper nozzle extending from the body and in fluid communication with the chamber configured to allow powder to exit or enter the chamber, the hopper nozzle being smaller than the bulk opening.

In certain embodiments, the hopper nozzle can extend at a non-right angle (e.g., about 15 degrees to about 75 degrees) relative to the bulk opening. The moveable cover can be removably attached to the body via a plurality of latches. The plurality of latches can be mounted to a rail disposed on each side of the body. The moveable cover can be shaped to slide on each rail.

In certain embodiments, one or more extensions can extend from opposite sides of the body. The one or more extensions can be one or more bolts disposed through the body that extend from the body on opposite sides of the body. The one or more bolts can be configured to support the weight of the container when full of powder. The one or more bolts can include two bolts. In certain embodiments, the bolts are flanged bolts.

In certain embodiments, the container can further include a handle extending from the body on an opposite side of the hopper nozzle from the bulk opening. The handle can be in any other suitable location.

The container can be sealed air-tight to maintain an inert environment therein for the powder. The container can include a gate operatively associated with the hopper nozzle and configured to maintain an inert environment within the container when attaching the hopper nozzle to an additive manufacturing system.

In accordance with at least one aspect of this disclosure, a system for supplying powder to a powder bed of an additive manufacturing machine can include a wall of an additive manufacturing machine comprising a powder deposit opening defined in the wall for receiving powder into the powder bed additive manufacturing machine, and a hopper elbow connected to the powder deposit opening and configured to hold a powder container thereon and fluidly communicate with the powder container for receiving powder from the powder container at an angle relative to the powder deposit opening and guiding the powder through the powder deposit opening and into the powder bed of the additive manufacturing machine. The system can further include a powder container as described above, wherein the powder container is connected to the hopper elbow via the hopper nozzle.

The system can include a funnel for catching unused powder and guiding the unused powder to a powder removal opening, wherein the powder container can be placed in fluid communication with the powder removal opening to receive the unused powder. The powder removal opening can include, or have an extension with, a connection type that is the same as a hopper elbow connection type the hopper elbow such that the powder container can connect to the powder removal opening. The connection type can include a sanitary flare.

In accordance with this disclosure, a kit for supplying powder to an additive manufacturing machine can include a powder container as described above filled with powder and sealed (e.g., for shipment).

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
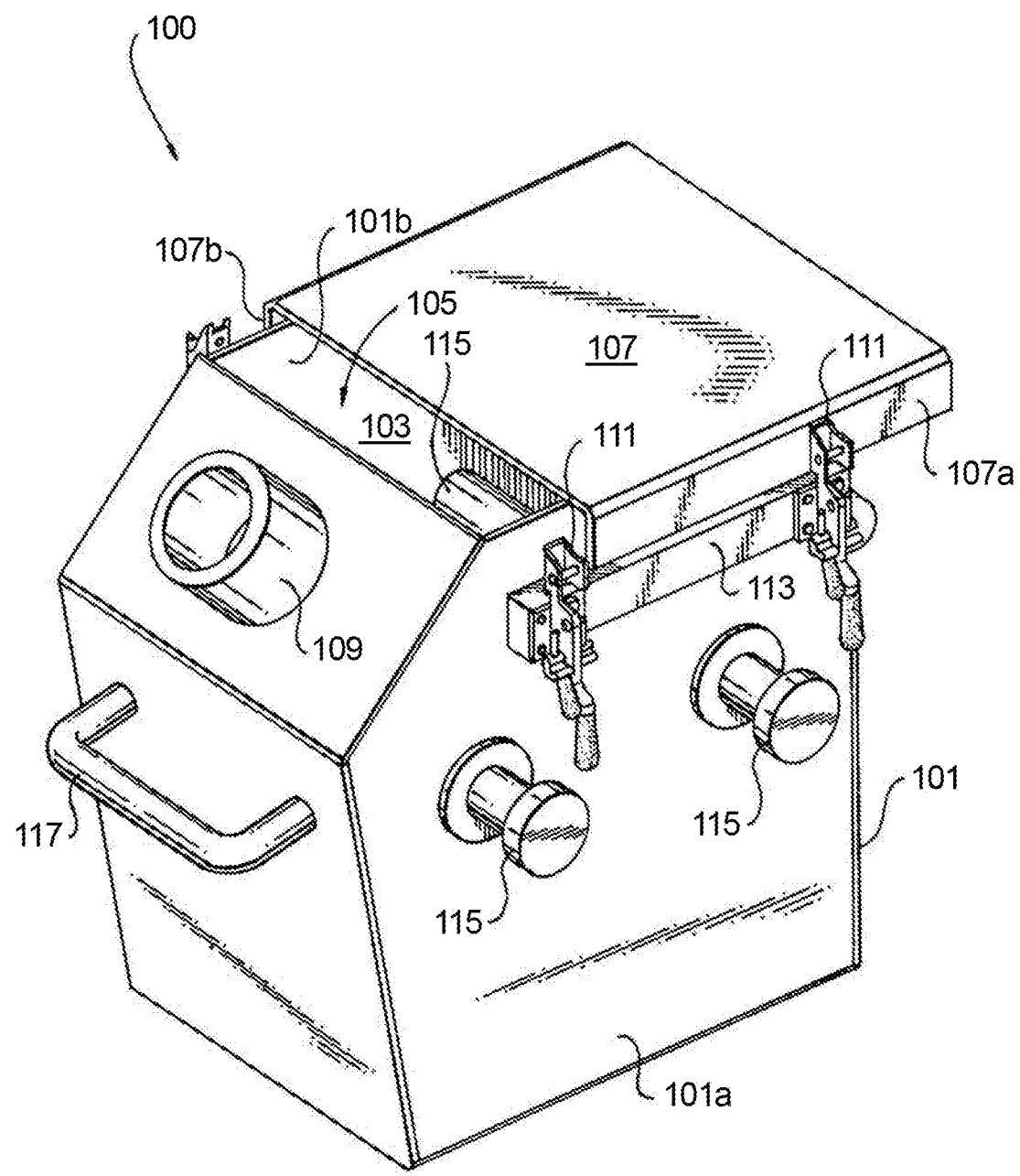
FIG. 1 is a perspective view of an embodiment of a powder container in accordance with this disclosure.
Figure 2:
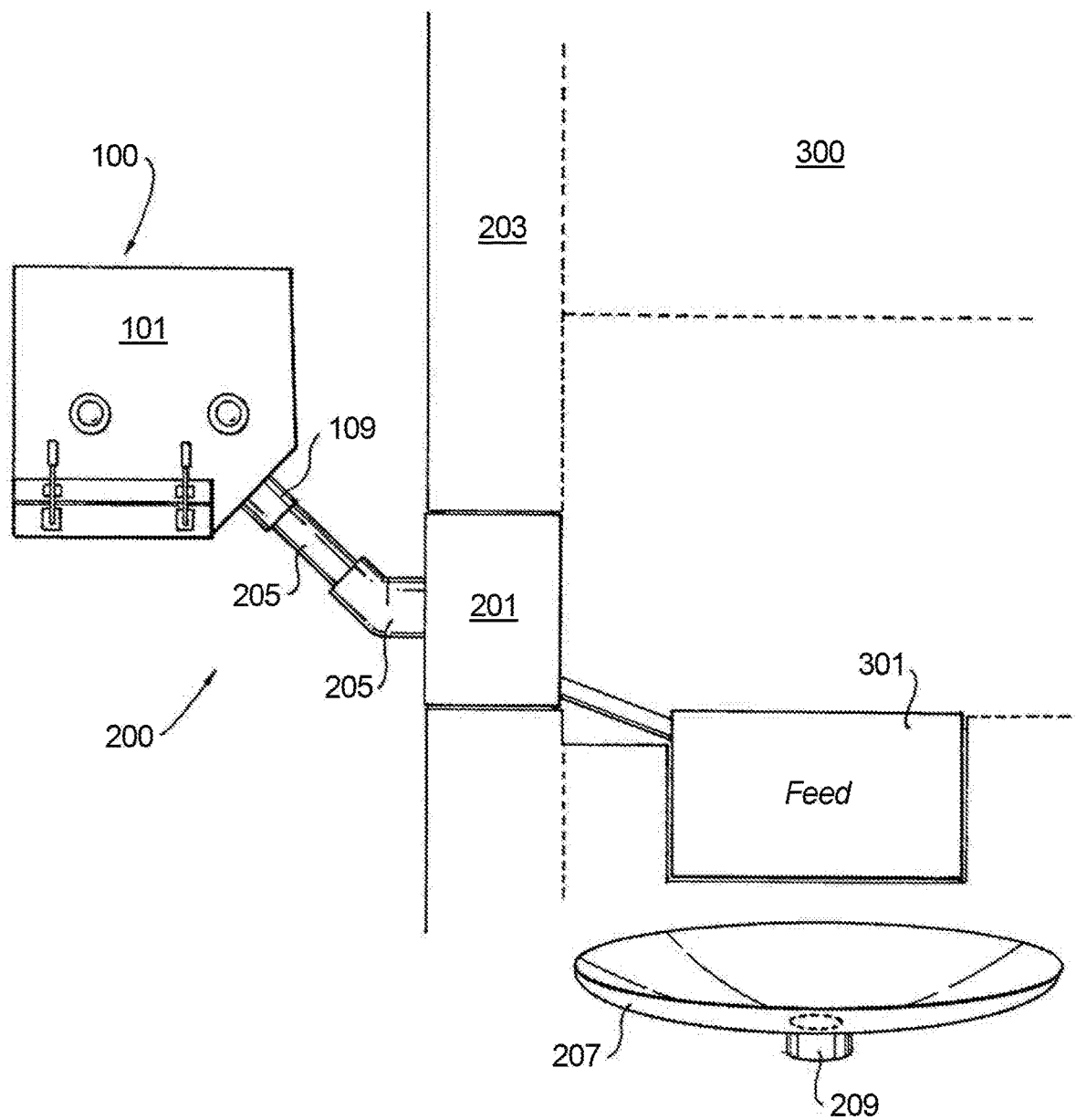
FIG. 2 is a schematic view of an embodiment of a container in accordance with this disclosure.

Reference will now be made to the drawings wherein like reference numerals identify similar structural features or aspects of the subject disclosure. For purposes of explanation and illustration, and not limitation, an illustrative view of an embodiment of a powder container in accordance with the disclosure is shown in FIG. 1 and is designated generally by reference character 100. Other embodiments and/or aspects of this disclosure are shown in FIG. 2. The systems and methods described herein can be used to provide powder to, and/or collect powder from an additive manufacturing machine in an efficient manner.

Referring to FIG. 1, a powder container 100 can include a body 101 defining a chamber 103. The body 100 and the chamber 103 can include any suitable shape. The body 101 can be made of any suitable material (e.g., metal, polymer).

The powder container 100 includes a bulk opening 105 defined by the body 101 for inserting or removing powder into the chamber 103. The bulk opening 105 can include any suitable size and/or shape (e.g., the entire top of the powder container 100).

A moveable cover 107 can be configured to selectively cover the bulk opening 105. As shown, the moveable cover 107 can include a channel shape such that one or more cap flanges 107a, 107b wrap around one or more sides 101a, 101b of the body 101. It is contemplated that the moveable cover 107 can include any suitable shape, however. In certain embodiments, the movable cover 107 and/or the body 101 can include a sealing element (not shown) that granularly and/or fluidly seals the bulk opening 105 such that powder cannot escape through the movable cover 107.

The powder container 100 also includes a hopper nozzle 109 extending from the body 101 and in fluid communication with the chamber 103 configured to allow powder to exit or enter the chamber 103. As shown, the hopper nozzle 109 is smaller than the bulk opening 105. In certain embodiments, the hopper nozzle 109 can extend at an angle (e.g., a non-right angle, about 45 degrees, between about 15 degrees and 75 degrees, or any other suitable angle) relative to the bulk opening 105 (e.g., the normal direction of a plane defining the bulk opening 105).

In certain embodiments, the hopper nozzle 109 can include a suitable connection type for mounting, locking, and/or sealing to an additive manufacturing system. For example, the hopper nozzle 109 can include a sanitary flare as part of a tri-clamp system which can allow for quick connect/disconnect and/or a seal.

The moveable cover 107 can be removably attached to the body 101 via a plurality of latches 111, for example. In certain embodiments, the plurality of latches 111 can be mounted to a rail 113 disposed on each side 101a, 101b of the body 101. As shown, in certain embodiments, the moveable cover 107 can be shaped to slide on each rail 113. The latches 111 can be mounted to any other suitable portion of the body 101 and/or rails 113 need not be included. It is also contemplated that one or more components of the latches 111 can be mounted to the moveable cover 107 to interact with a mating portion on the body.

In certain embodiments, one or more bolts 115 can be disposed through the body 101 and extend from the body 101 on opposite sides 101a, 101b of the body 101. The one or more bolts 115 can be configured to support the weight of the container 100 when full of powder (e.g., for carrying, transporting, storage, and/or mounting to an additive manufacturing system). The weight of the container 100 with powder can vary, and can be quite heavy (e.g., about 400 lbs or more, about 250 lbs or any other suitable weight). Thus the bolts 115 and/or the thickness of the body 101 can be sized accordingly.

As shown, the powder container 100 can include two bolts 115. In certain embodiments, the bolts 115 are flanged bolts as shown, however, any suitable shape and/or size is contemplated herein. Further, it is contemplated that the bolts 115 do not have to extend through the body 101, but may merely extend from the body 101 (e.g., and can be integrally formed with the body 101).

In certain embodiments, the powder container 100 can further include a handle 117 extending from the body 101 thereof. As shown, the handle 117 can be positioned under (e.g., opposite the bulk opening 105) the hopper nozzle 109. The handle 117 can be in any other suitable location of the powder container 100.

The container 100 can be sealed air-tight to maintain an inert environment therein for the powder. For example, the hopper nozzle 109 can be sealed in any suitable manner (e.g., with a suitable cap or valve). In certain embodiments, the container 100 can include a gate operatively associated with (e.g., disposed within) the hopper nozzle 109 and configured to maintain an inert environment within the container 100 when attaching the hopper nozzle 109 to an additive manufacturing system. In this regard, the gate of the hopper nozzle 109 can be opened (e.g., by a manually by a user, as a function of sealing the hopper nozzle to a hopper elbow 205 as described below, or in any other suitable manner).

Referring to FIG. 2, in accordance with at least one aspect of this disclosure, a system 200 for supplying powder to a powder bed 301 of an additive manufacturing machine 300 is shown. The system 200 can include a powder deposit opening 201 defined in a wall 203 (e.g., a wall of the additive manufacturing machine 300) for receiving powder into the powder bed additive manufacturing machine 300.

The system 200 also includes a hopper elbow 205 connected to the powder deposit opening 201. The hopper elbow 205 is configured to hold a powder container (e.g., as described above) thereon and fluidly communicate with the powder container 100 for receiving powder from the powder container 100 at an angle relative to the powder deposit opening 205. The hopper elbow 205 guides the powder through the powder deposit opening 201 and into the powder bed 301 (e.g., via one or more ramps or powder transfer systems) of the additive manufacturing machine 300.

The hopper elbow 205 can be operatively connected to a vibration mechanism (not shown) to vibrate the hopper and/or an attached powder container 100 for causing flow of the powder from the container 100 and through the hopper elbow 205. Any other method or device for imparting motion on the powder is contemplated herein.

The system 200 can further include a powder container 100 as described above such that the powder container can be connected to the hopper elbow 205 via the hopper nozzle 109. For example, the hopper nozzle 109 can include a mating connection type to the connection type of hopper elbow 205 (e.g., a mating sanitary flare of a tri-clamp system).

The system 200 can include a funnel 207 for catching unused powder (e.g., that falls off a side of the build area) and guiding the unused powder to a powder removal opening 209. The powder removal opening 209 can be sized to receive the hopper nozzle 109 of the powder container 100 such that a powder container 100 can be placed in fluid communication with the powder removal opening 209 to receive the unused powder. The powder removal opening 209 can include, or have an extension with, a connection type that is the same as a hopper elbow 205 connection type (e.g., a mating sanitary flare of a tri-clamp) such that the powder container 100 can also connect to the powder removal opening in the same manner (e.g., at the hopper nozzle 109).

In accordance with this disclosure, a kit for supplying powder to an additive manufacturing machine can include a powder container 100 as described above filled with powder and fluid sealed (e.g., for shipment). In this regard an additive manufacturer can receive a sealed container 100 that merely needs to be connected to the hopper elbow 205 to insert a desired amount of powder into the additive manufacturing system 300. The size of the container 100 can be modified to any suitable size (e.g., to hold 400 lbs of powder, less than 100 lbs of powder.)

As described above, embodiments include a container 100 for unsintered powder that can interface with both a feed port and a collection port (e.g., of a powder bed fusion machine and/or vacuum conveyor system). The fluid connection between the container 100 and the additive manufacturing machine 300 can be sealed (e.g., with a suitable connection type such as a sanitary flare) to allow maintenance of an inert environment.

Embodiments include an air-tight sealed cover 107 that allows for easy access to the interior of the container 100 if required. Embodiments include handles and bolts (e.g., for lifting and pivot points) for a hoist are included for ease of use. The angling of the hopper nozzle 109 relative to a direction of gravity can allow for less rotation of the container when pouring contents into the powder bed feed. Actuation of the feed fixture vibrator translates vibrations along the rigid elbow 205 to adequately guide the powder through the fixture into the feed ramp or other hopper system.

The methods and systems of the present disclosure, as described above and shown in the drawings, provide for powder containers and associated systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A powder container, comprising:
a body defining a chamber having a bulk opening;
a moveable cover configured to selectively cover the bulk opening; and
a hopper nozzle extending from the body and in fluid communication with the chamber configured to allow powder to exit or enter the chamber, the hopper nozzle being smaller than the bulk opening, wherein the bulk opening and hopper nozzle open at least partially in the same direction.

2. The powder container of claim 1, wherein the hopper nozzle extends at a non-right angle relative to the bulk opening.

3. The powder container of claim 2, wherein the non-right angle is between about 15 degrees and about 75 degrees.

4. The powder container of claim 1, wherein the moveable cover is removably attached to the body via a plurality of latches.

5. The powder container of claim 4, where the plurality of latches are mounted to a rail disposed on each side of the body.

6. The powder container of claim 5, wherein the moveable cover is shaped to slide on each rail.

7. The powder container of claim 1, further comprising one or more extensions extending from opposite sides of the body.

8. The powder container of claim 7, wherein the one or more extensions include one or more bolts disposed through the body and extending from the body on opposite sides of the body, the one or more bolts configured to support the weight of the container when full of powder.

9. The powder container of claim 8, wherein the at least one bolt includes two bolts.

10. The powder container of claim 9, wherein the bolts are flanged bolts.

11. The powder container of claim 1, further comprising a handle extending from the body on an opposite side of the hopper nozzle from the bulk opening.

12. The powder container of claim 1, wherein the container is sealed air-tight to maintain an inert environment therein for the powder.

13. The powder container of claim 12, wherein the container includes a gate operatively associated with the hopper nozzle and configured to maintain an inert environment within the container when attaching the hopper nozzle to an additive manufacturing system.

14. A system for supplying powder to a powder bed of an additive manufacturing machine, comprising:
a wall of an additive manufacturing machine comprising a powder deposit opening defined in the wall for receiving powder into the powder bed additive manufacturing machine;
a hopper elbow connected to the powder deposit opening and configured to hold a powder container thereon and fluidly communicate with the powder container for receiving powder from the powder container at an angle relative to the powder deposit opening and configured to guide the powder through the powder deposit opening and into the powder bed of the additive manufacturing machine, and
further comprising the powder container connected to the hopper elbow including:
a body defining a chamber having a bulk opening;
a moveable cover configured to selectively cover the bulk opening; and
a hopper nozzle extending from the body and in fluid communication with the chamber configured to allow powder to exit or enter the chamber, the hopper nozzle being smaller than the bulk opening, wherein the powder container is connected to the hopper elbow via the hopper nozzle, wherein the bulk opening and the hopper nozzle open at least partially in the same direction.

15. The system of claim 14, further comprising a funnel configured to catch unused powder and guiding the unused powder to a powder removal opening, wherein the powder container can be placed in fluid communication with the powder removal opening to receive the unused powder.

16. The system of claim 15, wherein the powder removal opening includes an extension with a connection type that is the same as a hopper elbow connection type the hopper elbow such that the powder container can connect to the powder removal opening.

17. The system of claim 16, wherein the connection type includes a sanitary flare.

18. A kit for supplying powder to an additive manufacturing machine, comprising:
a sealed powder container filled with the powder, the powder comprising:
a body defining a chamber having a bulk opening;
a moveable cover configured to selectively cover the bulk opening; and
a hopper nozzle extending from the body and in fluid communication with the chamber configured to allow powder to exit or enter the chamber, the hopper nozzle being smaller than the bulk opening, wherein the bulk opening and hopper nozzle open at least partially in the same direction.

* * * * *